US009752957B2

(12) United States Patent
McAvey

(10) Patent No.: US 9,752,957 B2
(45) Date of Patent: Sep. 5, 2017

(54) FUEL SYSTEM PRESSURE TESTER FOR MOTORCYCLES

(71) Applicant: McAvey Enterprises LLC, Ridgewood, NJ (US)

(72) Inventor: Michael McAvey, Ridgewoood, NJ (US)

(73) Assignee: MCAVEY VENTURES LLC, Ridgewood, NJ (US)

( * ) Notice: Subject to any disclaimer, the term of this patent is extended or adjusted under 35 U.S.C. 154(b) by 83 days.

(21) Appl. No.: 14/208,926

(22) Filed: Mar. 13, 2014

(65) Prior Publication Data
US 2014/0260651 A1 Sep. 18, 2014

Related U.S. Application Data

(60) Provisional application No. 61/784,017, filed on Mar. 14, 2013.

(51) Int. Cl.
*G01L 19/00* (2006.01)
*G01M 15/02* (2006.01)
*G01M 15/09* (2006.01)
*G01L 19/16* (2006.01)

(52) U.S. Cl.
CPC .............. *G01M 15/02* (2013.01); *G01L 19/16* (2013.01); *G01M 15/09* (2013.01)

(58) Field of Classification Search
CPC ................................ G01L 7/182; G01M 15/02
USPC ..................................................... 73/700, 756
See application file for complete search history.

(56) References Cited

U.S. PATENT DOCUMENTS

| 3,650,155 | A | * | 3/1972 | McJones | G01L 19/0007 137/321 |
| 4,454,759 | A | * | 6/1984 | Pirkle | G01F 23/02 116/276 |
| 5,092,294 | A | * | 3/1992 | Jackson | B67D 7/04 123/198 C |
| 5,183,078 | A | * | 2/1993 | Sorrell | F02M 65/00 137/881 |
| 5,187,974 | A | * | 2/1993 | Mellits | G01M 3/025 73/40 |
| 5,357,792 | A | * | 10/1994 | Getenby | G01M 15/09 73/114.43 |
| 5,787,916 | A | * | 8/1998 | Shaw | F16K 1/307 137/14 |

(Continued)

*Primary Examiner* — Lisa Caputo
*Assistant Examiner* — Tran M Tran
(74) *Attorney, Agent, or Firm* — Brinks Gilson & Lione

(57) ABSTRACT

A fuel system pressure tester for motorcycles adapted to be connected in-line with a fuel tank female fitting and a fuel line male fitting, has a fitting body, a first fitting for connection with the fuel tank fitting with an internal, normally closed valve, a second fitting for connection with the fuel line fitting, a pressure gauge, and a manually operated valve with a valve actuating element and a connection for a fuel hose. The fitting body has an internal passageway connecting the first fitting, the second fitting, the pressure gauge, and the manually operated valve. A method of testing a fuel system of the motorcycle involves connecting the pressure tester to the fuel tank by connecting the male tester fitting with the fuel tank female fitting, and connecting the female tester fitting with the fuel line male fitting, energizing the in-tank fuel sending unit, and reading pressure within the tester indicated by the pressure gauge.

12 Claims, 3 Drawing Sheets

(56) References Cited

U.S. PATENT DOCUMENTS

| | | | | |
|---|---|---|---|---|
| 5,918,282 A * | 6/1999 | Schwager | B60K 15/035 | 73/756 |
| 5,992,438 A * | 11/1999 | Shaw | F16K 1/307 | 137/14 |
| 6,202,481 B1 * | 3/2001 | Basore | G01L 19/0007 | 73/114.43 |
| 6,209,560 B1 * | 4/2001 | Shaw | F16K 1/307 | 137/14 |
| 6,209,562 B1 * | 4/2001 | Shaw | F17C 13/025 | 137/15.18 |
| 6,371,088 B1 * | 4/2002 | Wheeler | B01D 29/114 | 123/510 |
| 6,845,673 B2 * | 1/2005 | Cho | G01L 19/08 | 73/700 |
| 6,857,419 B1 * | 2/2005 | Harvey | B01D 53/002 | 123/41.31 |
| 7,707,993 B2 * | 5/2010 | Coldren | F02M 57/021 | 123/299 |
| 7,743,750 B2 * | 6/2010 | Ritz | F02M 37/0011 | 123/509 |
| 7,762,139 B2 * | 7/2010 | Kurtz | G01L 13/025 | 73/714 |
| 8,028,584 B2 * | 10/2011 | Otsuka | G01L 19/0069 | 73/706 |
| 8,091,583 B2 * | 1/2012 | Olshanetsky | F02M 25/0872 | 137/493.2 |
| 8,490,647 B2 * | 7/2013 | Guion | G05D 16/10 | 137/495 |
| 8,805,607 B2 * | 8/2014 | Smither | F02D 41/0027 | 701/103 |
| 9,139,082 B2 * | 9/2015 | Paolucci | B60K 15/00 | |
| 2001/0002552 A1 * | 6/2001 | Vinci | G01D 21/02 | 73/753 |
| 2010/0089306 A1 * | 4/2010 | Dunkle | G01F 23/50 | 116/228 |

\* cited by examiner

FUEL SYSTEM PRESSURE TESTER FOR MOTORCYCLES

CROSS-REFERENCE TO RELATED APPLICATIONS

This application claims the priority of Provisional Application No. 61/784,017, filed on Mar. 14, 2013, which is herewith incorporated by reference in its entirety.

FIELD OF THE INVENTION

This invention relates to a testing device for a motor vehicle and in particular to a pressure tester for fuel systems adapted for motorcycles.

BACKGROUND OF THE INVENTION

In maintenance and diagnostic procedures, certain tests are performed for fuel systems to determine if elements of the system are operating properly. Modern large motorcycles feature a fuel sending unit disposed inside the fuel tank of the motorcycle. The sending unit typically includes an electric fuel pump along with a pickup tube, filter screen, and a fuel level sensor. The sending unit is powered by the vehicle electrical bus and pressurizes the fuel and supplies it to a fuel line, which leads to the induction system of the vehicle engine, typically a fuel injection unit, although some older motorcycles use carburetors.

Maintenance professionals use a variety of diagnostic tools in tracking down vehicle maintenance and breakdown issues. A fast and accurate testing system is desired, which enables the fuel pressure generated by the fuel sending unit to be measured. It is preferred that the use of such a diagnostic tool can be done quickly and with a minimal number of steps required of the maintenance technician. The tool should also be usable without causing unnecessary spillage of highly flammable gasoline in the symbol to operate.

In addition to a fuel system pressure test in a static or idle condition; namely, a condition in which the vehicle's engine is not demanding a maximum of fuel flow rate, there is further a need to measure fuel pressure in an operating condition which is equivalent to a full load condition. Ideally, such a fuel system test may be carried out without requiring that the engine being operated at full power, either on the road or on a chassis dynamometer. Both of these requirements are labor and equipment intensive and pose certain risks. Moreover, some fuel system faults cannot be resolved without performing a load test. For example, a clogged or partially clogged fuel pickup screen may be capable of enabling a normal no-load pressure to be generated, while such a fault would not permit pressure to be maintained in a fuel flow condition equivalent to a high-power operating condition of the engine.

SUMMARY OF THE INVENTION

The fuel system pressure tester in accordance with this invention is adapted to be quickly connected in-line with a conventional motorcycle fuel system. The system of the present invention enables tests to be carried out quickly, without special tools, and can provide both static and load testing evaluations.

According to one aspect of the invention, a fuel system pressure tester for motorcycles is adapted to be connected in-line with a fuel tank female fitting and a fuel line male fitting. The pressure tester includes a fitting body, a male fitting affixed to the fitting body adapted for connection with the fuel tank female fitting, a female fitting affixed to the fitting body adapted for connection with the fuel line male fitting, a pressure gauge affixed to the fitting body, a manually operated valve affixed to the fitting body having a valve actuating element and a connection for a fuel hose, and an internal passageway in the fitting body connecting the male fitting, the female fitting, the pressure gauge, and the manually operated valve.

According to another aspect of the invention, the valve actuating element may be a plunger element and the manually operated valve is normally in a closed condition and opens when the plunger element is actuated.

According to a further aspect of the invention, the female fitting has an internal normally closed valve with a valve member and a valve seat, and the fuel system pressure tester may further include a venting tool with a post having a sufficient length to remove the valve member of the female fitting from the valve seat and to open the manually operated valve. The venting tool may be attached to the fitting body with a flexible strap.

According to yet another aspect of the invention, a method of testing a fuel system of a motorcycle having a fuel tank with a female fitting, a fuel line with a male fitting, and an in-tank fuel sending unit, includes the steps of providing a pressure tester having a fitting body, a male tester fitting affixed to the fitting body adapted for connection with the fuel tank female fitting, a female tester fitting affixed to the fitting body adapted for connection with the fuel line male fitting, a pressure gauge affixed to the fitting body, a valve affixed to the fitting body having a valve actuating element and a connection for a fuel hose, the fitting body having an internal passageway connecting the male tester fitting, the female tester fitting, the pressure gauge, and the manually operated valve, connecting the pressure tester to the fuel tank by connecting the male tester fitting with the fuel tank female fitting, and connecting the female tester fitting with the fuel line male fitting, energizing the in-tank fuel sending unit, and reading pressure within the tester indicated by the pressure gauge.

According to another aspect of the invention, the method may further include the step of relieving pressure in the pressure tester after reading the pressure by activating the valve actuating element.

According to a further aspect of the invention, the method may further include the step of conducting a fuel pressure load test by inserting the fuel hose into a receptacle and reading the pressure step occurring while the valve actuating element is operated and causes a fuel flow through the pressure tester simulating a full-load operating condition of the motorcycle engine. The receptacle may be the fuel tank of the motorcycle, and the fuel hose may be inserted through a filler opening of the fuel tank.

After completion of the tests, the method may further include the steps of deenergizing the in-tank fuel sending unit, inserting the fuel hose into a receptacle, operating the valve actuating element, and releasing fuel through the fuel hose until atmospheric pressure prevails inside the fitting body. Afterwards, the pressure tester may be disconnected from the fuel tank by disconnecting the male tester fitting from the fuel tank female fitting, and by disconnecting the female tester fitting from the fuel line male fitting. A post of a venting tool may be inserted into the female fitting for opening an internal valve while the fuel hose is or remains inserted in the receptacle. Operating the valve actuating element will then allow the fuel to drain from the fitting body through the fuel hose by gravitational force.

Further details and benefits will become apparent by the following description of the accompanying drawings.

DETAILED DESCRIPTION OF THE INVENTION

Figures 4A, 4B:
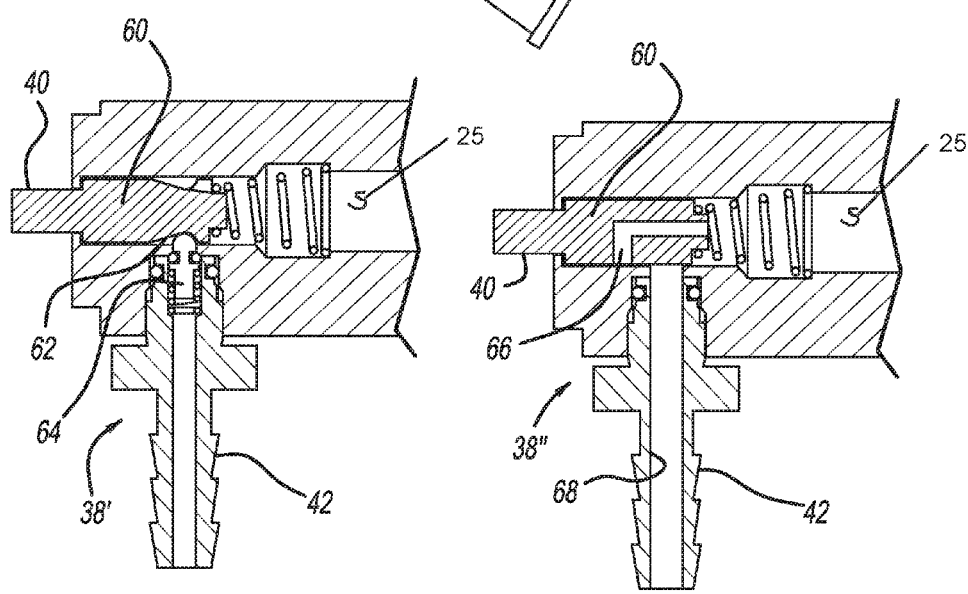
FIGS. 4a and 4b show further alternative details of the fuel system pressure tester of FIG. 1 in a cross-section along the image plane.

The drawing figures are included for purely illustrative purposes and are not intended to limit the scope of the invention. The drawings, in particular FIGS. 4a and 4b, are not necessarily to scale, unless specified.

Figure 1:
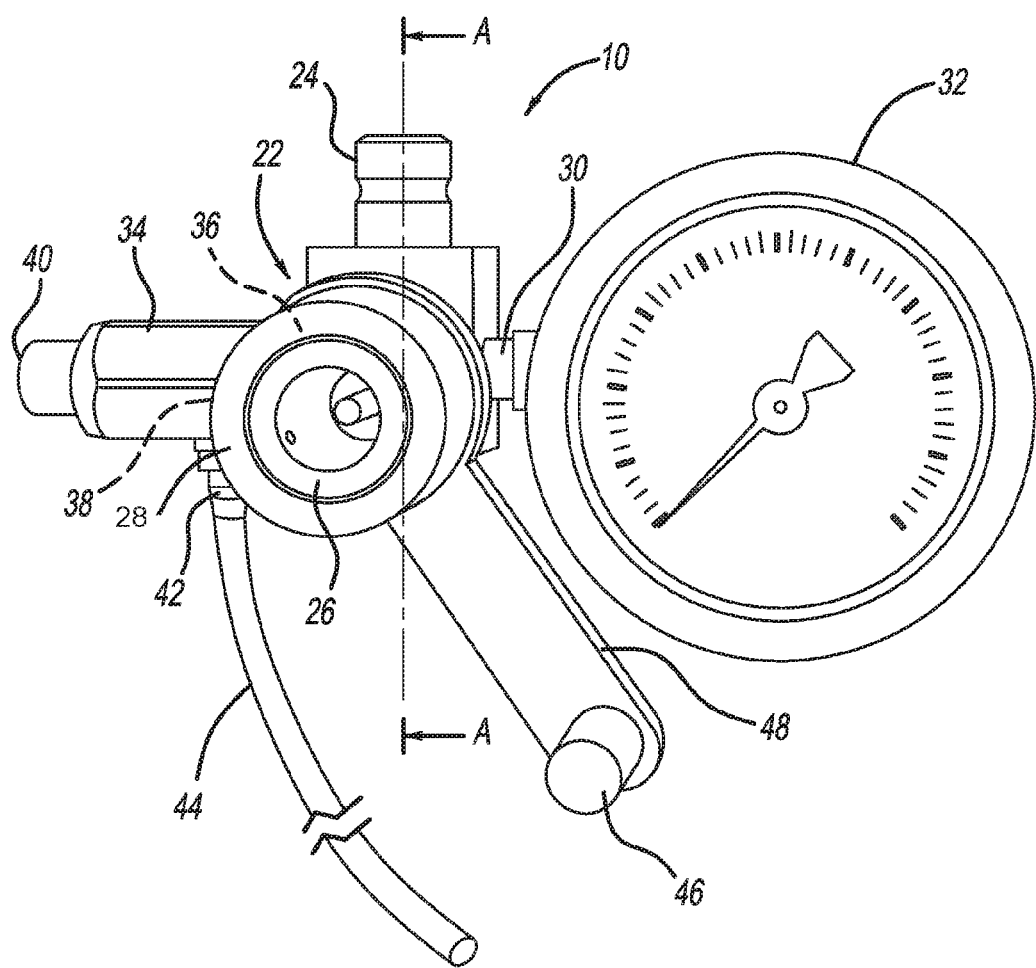
FIG. 1 shows a fuel system pressure tester in accordance with this invention.
Figure 2:
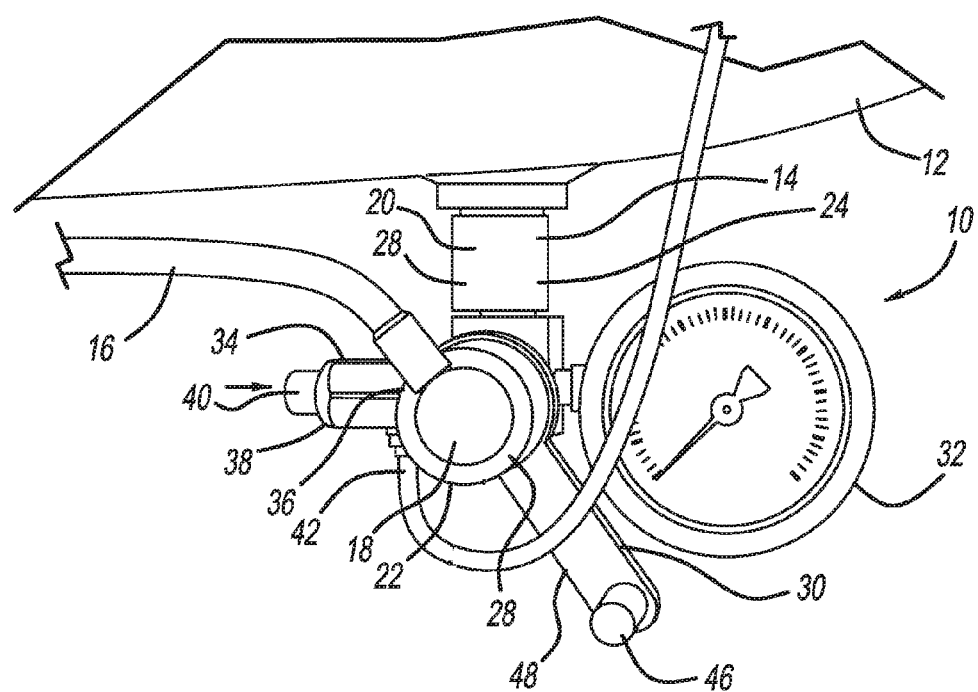
FIG. 2 shows the fuel system pressure tester of FIG. 1 coupled with a motorcycle fuel tank and fuel line and conducting a static pressure test or a load fuel system pressure test.

The fuel system pressure tester in accordance with this invention is shown in FIGS. 1 and 2 and is generally designated by reference number 10. Pressure tester 10 is particularly adapted for use with heavyweight Harley-Davidson motorcycles, such as model types Dyna, Softail, or Touring, to name a few, which are very numerous in the United States and around the world. Pressure tester 10 could be adapted for use with other motorcycle models and brands with provisions of suitable fuel system connections.

As shown in FIG. 2, the associated motorcycle has fuel tank 12 having an extending female quick connect fitting 14. Fitting 14 is normally connected with fuel line 16 which has a complementary male fitting 18. To provide ease of installation on the vehicle and servicing, fittings 14 and 18 are easily connected and disconnected. Female fuel connection fitting 14 includes an axially moving movable outer sleeve 20 which can be pushed up when it is desired to insert and connect male fitting 18 or when it is desired to release male fitting 18. Accordingly, in the normal use condition, male fitting 18 and fuel line 16 would be connected to the fuel tank 12 through the connection formed by fittings 14 and 18. Female fuel tank fitting 14 includes an internal plunger type valve (not shown in FIG. 2), which is closed when male fitting 18 is disconnected to prevent uncontrolled fuel leakage. Connection of male fitting 18 to fitting 14 acts on the internal valve element to open the flow path when the two fittings are connected.

Figure 3:
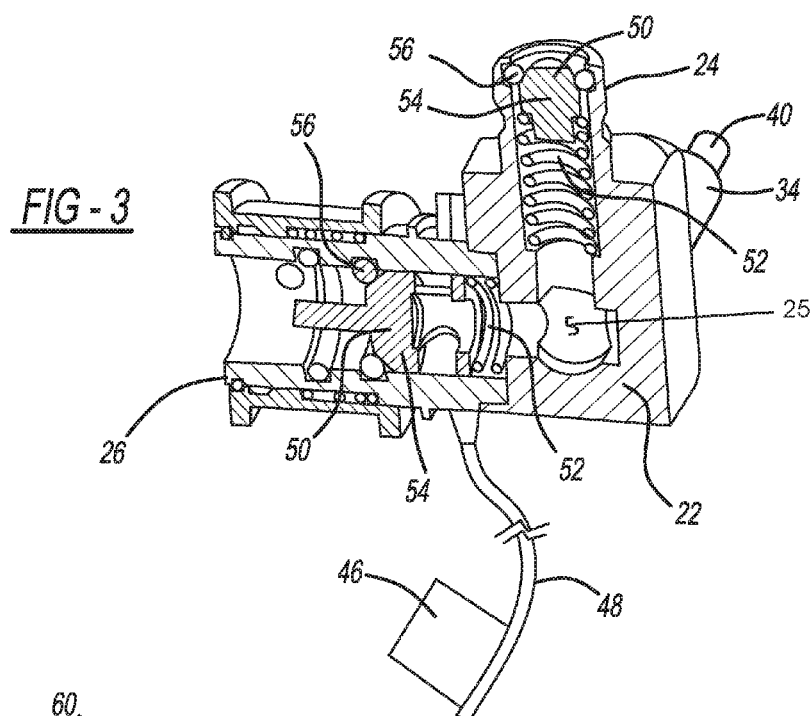
FIG. 3 shows a detail of the fuel system pressure tester of FIG. 1 in a cross-section along the line A-A.

Fuel system pressure tester 10, which is shown as a separate device in FIG. 1 and connected to the motorcycle in FIG. 2, includes fitting body 22 having an internal hollow passageway communicating with the number of flow paths as will be described. Fitting body 22 forms male fitting 24, which is identically dimensioned as is male fitting 18, enabling male fitting 24 to be connected to fuel tank 12 in a manner equivalent to the connection with fuel line fitting 18. Fitting body 22 further forms a female fitting 26 identical in construction with fuel tank fitting 14 also having an axially movable sleeve 28. Male fitting 24 and female fitting 26 are shown in greater detail in FIG. 3. Each of the female and male fittings 26 and 24 contains a valve 50, which is held open when the fittings 26 and 24 are coupled with the male and female connectors 18 and 20 of the motorcycle, thereby allowing fuel to flow through the fitting body 22. When the fittings 26 and 24 are disconnected, a spring 52 in each of the valves 50 closes the valve 50 by allowing a valve member 54 to seal against an annular seat 56 formed by an O-ring, thereby stopping the flow of fuel through the fitting.

Fitting body 22 further features a drilled and tapped pressure gauge port 30 (not shown in detail) which receives pressure gauge 32. Valve 34 is also a threaded into an associated threaded valve port 36 (not shown in detail) and includes an internal plunger type valve 38, which is normally closed. Internal components of plunger valve 38 may be similar to or identical with Schrader type inflation valves found in vehicle tires. When plunger end 40 is depressed, a fuel flow path opens through valve fitting 36 and into nipple 42 having relief and gas flow hose 44 attached thereto. The internal cavity of fitting body 22 communicates with internal passageway 25 of each of fittings 24 and 26, as well as ports 30 and 36.

FIGS. 4a and 4b show two embodiments of valves 38' and 38" that may form manually operated valve 38. Valve 38' of FIG. 4a is a spring-loaded seat valve operated by a ramp 62 that is moved by the plunger end 40 of plunger 60'. The plunger 60' is biased outward by a spring 64 so that valve 38 is normally closed. Upon pressing plunger end 40, the ramp 62 acts on valve member 64 against a valve spring and removes the valve member 64 from its valve seat. Seat valves have the advantage that elastic components can compensate for manufacturing tolerances so that productions costs are low.

While not shown, a seat valve may alternatively be arranged coaxially with the plunger 60', for instance a valve similar to the one in the female fitting, where the valve member is biased toward the plunger end 40 and rests on a valve seat between the valve member and the plunger. The valve member may be arranged in the fitting body between the nipple 42 on one side and the male and female fittings on the other side. This arrangement would have the advantage that the pressure inside the fitting body 22 acts on the valve in the valve closing direction.

FIG. 4b shows a machined sliding valve 38". Plunger 60" has an internal channel extending from its distal axial face to a radial opening 66 that normally has no overlap with a radial bore 68 through nipple 42. Upon pressing plunger end 40, the radial opening 66 is aligned with the radial bore 68, thus establishing a fluid communication of male and female fittings 24 and 26 with bore 68. A sliding valve has the advantage that the pressure inside the fitting body 22 acts on the plunger in the valve closing direction so that the valve 38" cannot be opened by a high internal pressure.

Use and operation of pressure tester 10 will now be described with reference to FIG. 2. As mentioned previously, in the normal operating condition of the motorcycle, fuel line 16 is connected with fuel tank 12 through quick connect fittings 14 and 18. When it is desired to conduct a static, idle, or part-load pressure test, pressure tester 10 is inserted in-line with fuel line 16, as shown in FIG. 2. Pressure tester 10 does not interfere with the flow of fuel from the fuel tank 12 to the associated engine, enabling it to be operated during the testing process. Some motorcycles are designed such that its electric fuel pump will not operate without the engine running as a safety feature to prevent a dangerous fuel spillage condition from occurring. When pressure tester 10 is installed as shown in FIG. 2, the associated motorcycle engine may be operated, for example in an idle condition. Such operation will cause the internal fuel sending unit within the tank 12 to be activated, supplying pressurized fuel through pressure tester 10 and into fuel line 16. Pressure gauge 32 reads the pressure of the fuel within the fuel line. This can be used as a diagnostic tool to determine if the measured pressure is within predetermined limits for a partial load condition. In this operating condition, plunger valve 38 is not operated.

For motorcycles that allow the fuel pump to operate to provide a fuel pressure without operating the engine, a static fuel pressure test can be performed by starting the fuel pump, but not the engine, so that no fuel flow occurs through the fuel line 16.

If it is only desired to conduct a static or partial load pressure test, after reading pressure from pressure gauge 32, pressure tester 10 may be removed after shutting off the motorcycle engine. Since pressurized fuel remains within the fuel system after the sending unit is deactivated, it is desirable to provide a pressure relief feature. This is provided by plunger valve 38 and its connection with hose 44. The distal end of hose 44 can be placed into fuel tank 12's fuel filler opening (not shown), and the plunger end 40 may be depressed, which will squirt a small quantity of fuel into the tank. This relieves pressure in the tester 10 and the associated fuel delivery system components of the motorcycle, and enables the tester to be disconnected without a spray of fuel at the connections.

Pressure tester 10 may also be used to provide a fuel system load pressure test in which fuel system pressure is measured while the fuel system is delivering fuel at a high flow rate, for example, equivalent to a maximum-load, full-throttle condition of the engine, but without requiring the motorcycle engine to be operated at the full-throttle condition. This can be done by depressing plunger end 40 while the vehicle is engine is running at idle, and placing the distal end of hose 44 into the tank fuel filler opening. In this case a small flow of fuel is flowing through fuel line 16 to the engine, which is operating at an idle condition. However, a significant flow rate of fuel occurs through valve 34 and hose 44 and, therefore, the fuel system components in fuel tank 12 are delivering fuel at a high rate simulating a full-throttle, full-load operating condition. To this end, the path to and through the valve 34 may be provided with a calibrated orifice dimensioned for a fuel flow that corresponds to the difference between the fuel consumption of the idling engine and the fuel consumption of the engine run at full throttle to that the sum of the fuel flow through the fuel line 16 and through the hose 44 properly simulates the fuel flow through the fuel line 16 when the engine runs at full throttle. Instead of a calibrated orifice, the pressure tester 10 may in its entirety inherently have an overall maximum flow capacity through hose 44 that corresponds to the difference to the difference between the fuel consumption of the idling engine and the fuel consumption of the engine run at full throttle.

In analogy, the above-described test may be likewise performed by only operating the fuel pump with battery power without starting the engine, where possible. The fuel flow through hose 44 simulates an operating engine. The fuel consumption of an idling engine is very low compared with a full-throttle condition so that the lack of fuel flow to an idling engine may be insignificant for measuring purposes. It is, however, conceivable to provide for a variety of insertable orifices (not shown) that are dimensioned for simulating various operating conditions with or without a running engine.

Pressure as measured by pressure gauge 32 is recorded to determine if it meets manufacturer specifications for such operating conditions. After either the static (partial load) or a load test, the engine is stopped and pressure tensor tester 10 is disconnected after relieving any residual pressure in the system by a depressing plunger valve end 40.

A venting tool with a post 46 is provided which is attached to pressure sensor 10 by a flexible strap 48. Venting post 46 is provided to be inserted into female fitting 26 to depress its internal valve member 54 to permit drainage of fuel in tester 10 after it is disconnected from fuel tank 12. When simultaneously the plunger end 40 is depressed, the drainage occurs by the force of gravity through hose 44.

While the above description constitutes the preferred embodiment of the present invention, it will be appreciated that the invention is susceptible to modification, variation and change without departing from the proper scope and fair meaning of the accompanying claims.

The invention claimed is:

1. A fuel system pressure tester for motorcycles adapted to be connected in-line with a fuel tank fitting which is one of a male fitting and a female fitting and a fuel line fitting, which is the other one of the male fitting and the female fitting, the fuel system pressure tester comprising:
   a fitting body forming an internal passageway,
   a first fitting affixed to the fitting body adapted for connection with the fuel tank fitting and communicating with the internal passageway,
   a first normally closed valve with a first valve member and a first valve seat arranged in the first fitting for preventing the flow of fuel through the first fitting when the first normally closed valve is in a closed condition and permitting the flow of fuel through the first fitting when the first normally closed valve is an open condition,
   a second fitting affixed to the fitting body adapted for connection with the fuel line fitting and communicating with the internal passageway,
   a second normally closed valve with a second valve member and a second valve seat arranged in the second fitting for preventing the flow of fuel through the second fitting when the second normally closed valve is in a closed condition and permitting the flow of fuel through the second fitting when the second normally closed valve is an open condition,
   a pressure gauge affixed to the fitting body and communicating with the internal passageway, and
   a manually operated valve affixed to the fitting body communicating with the internal passageway having a valve actuating element and a connection for a fuel hose, the manually operated valve allowing the flow of fuel between the internal passageway and the fuel hose when in an open condition, and preventing the flow of fuel between the internal passageway and the fuel hose when in a closed condition.

2. The fuel system pressure tester in accordance with claim 1, wherein the manually operated valve actuating element is a plunger element and the manually operated valve is normally in the closed condition and transitions to the open condition when the plunger element is operated.

3. The fuel system pressure tester in accordance with claim 1, further comprising a venting tool with a post having a sufficient length to move the second valve member of the second fitting from the second valve seat and to actuate the internal normally closed valve to the open condition.

4. The fuel system pressure tester in accordance with claim 3, wherein the venting tool is attached to the fitting body with a flexible strap.

5. The fuel system pressure tester in accordance with claim 1, wherein the first fitting is a female fitting and the second fitting is a male fitting.

6. A method of testing a fuel system of a motorcycle having a fuel tank with a tank female fitting, a fuel line with a fuel line male fitting, and an in-tank fuel sending unit, comprising the steps of:

provinding a pressure tester having a fitting body forming an internal passageway, a male fitting affixed to the fitting body adapted for connection with the fuel tank female fitting and communicating with the internal passageway, providing a first normally closed valve with a first valve member and a first valve seat arranged in the male tester fitting for preventing the flow of fuel through the male tester fitting when the first normally closed valve is in a closed condition and permitting the flow of fuel through the male tester fitting when the first normally closed valve is an open condition, providing a female tester fitting affixed to the fitting body adapted for connection with the fuel line male fitting and communicating with the internal passageway, providing a second normally closed valve with a second valve member and a second valve seat arranged in the female tester fitting for preventing the flow of fuel through the female fitting when the second normally closed valve is in a closed condition and permitting the flow of fuel through the female tester fitting when the second normally closed valve is an open condition, providing a pressure gauge affixed to the fitting body and communicating with the internal passageway, providing a manually operated valve affixed to the fitting body having a valve actuating element and a connection for a fuel hose, the manually operated valve allowing the flow of fuel between the internal passageway and the fuel hose when in an open condition, and preventing the flow of fuel between the internal passageway and the fuel hose when in a closed condition connecting the pressure tester to the fuel tank by connecting the male tester fitting with the fuel tank female fitting, and connecting the female tester fitting with the fuel line male fitting, energizing the in-tank fuel sending unit, and reading pressure within the tester internal passageway indicated by the pressure gauge.

7. The method of testing in accordance with claim 6, further comprising the step of relieving pressure in the pressure tester after reading the pressure by moving the first or second valve member to the open condition.

8. The method of testing in accordance with claim 6, further comprising the step of conducting a fuel pressure load test by inserting the fuel hose into a receptacle and reading the pressure step occurring while the valve actuating element is operated and causing a fuel flow through the pressure tester simulating a full-load operating condition of the motorcycle engine.

9. The method of testing in accordance with claim 8, wherein the receptacle is the fuel tank and the fuel hose is inserted through a fuel tank filler opening.

10. The method of testing in accordance with claim 6, further comprising the steps of providing a valve actuating element to move the first or second valve element to the open condition, deenergizing the in-tank fuel sending unit, inserting the fuel hose into a receptacle, operating the first or second valve element to the open condition, and releasing fuel through the fuel hose until atmospheric pressure prevails inside the fitting body internal passageway.

11. The method of testing in accordance with claim 6, further comprising the steps of disconnecting the pressure tester from the fuel tank by disconnecting the male tester fitting from the fuel tank female fitting, and by disconnecting the female tester fitting from the fuel line male fitting.

12. The method of testing in accordance with claim 11, further comprising the steps of inserting the fuel hose into a receptacle, inserting a venting post into the female fitting for opening the first internal valve, operating the valve actuating element, and allowing the fuel to drain from the fitting body through the fuel hose by gravitational force.

* * * * *